United States Patent [19]

Horton

[11] Patent Number: 4,757,949

[45] Date of Patent: Jul. 19, 1988

[54] APPARATUS FOR SHREDDING RUBBER TIRES

[76] Inventor: Norman P. Horton, 6918 Greenback La., Citrus Heights, Calif. 95610

[21] Appl. No.: 860,253

[22] Filed: May 6, 1986

Related U.S. Application Data

[63] Continuation-in-part of Ser. No. 520,467, Aug. 4, 1983, abandoned.

[51] Int. Cl.⁴ ............................................. B02C 19/12
[52] U.S. Cl. ..................................... 241/38; 241/224; 241/236; 241/DIG. 31
[58] Field of Search ............... 241/DIG. 38, 236, 166, 241/167, 243, DIG. 31, 38, 41, 62, 224, 225

[56] References Cited

U.S. PATENT DOCUMENTS 3,991,944 11/1976 Baikoff ............................ 241/243 X
4,015,782 4/1977 Granite ............................ 241/243 X
4,134,556 1/1979 Ehrlich et al. .................. 241/236 X

FOREIGN PATENT DOCUMENTS 633601 11/1978 U.S.S.R. ............................. 241/236

Primary Examiner—Mark Rosenbaum
Attorney, Agent, or Firm—Owen, Wickersham & Erickson

[57] ABSTRACT

A tire shredder. A housing has a vertical passage therein leading to a series of transversely disposed cutter wheels on adjacent parallel shafts. The shafts are rotated at different speeds, such as at 28 r.p.m. for one shaft and 34 r.p.m. for the other. The cutter wheels have flat side walls that partially overlap, so that rotation results in a scissors action reducing the rubber tires into manageable and disposable pieces. Preferably each cutter wheel has at least one tooth for engaging tires and pulling them into the shredder.

19 Claims, 4 Drawing Sheets

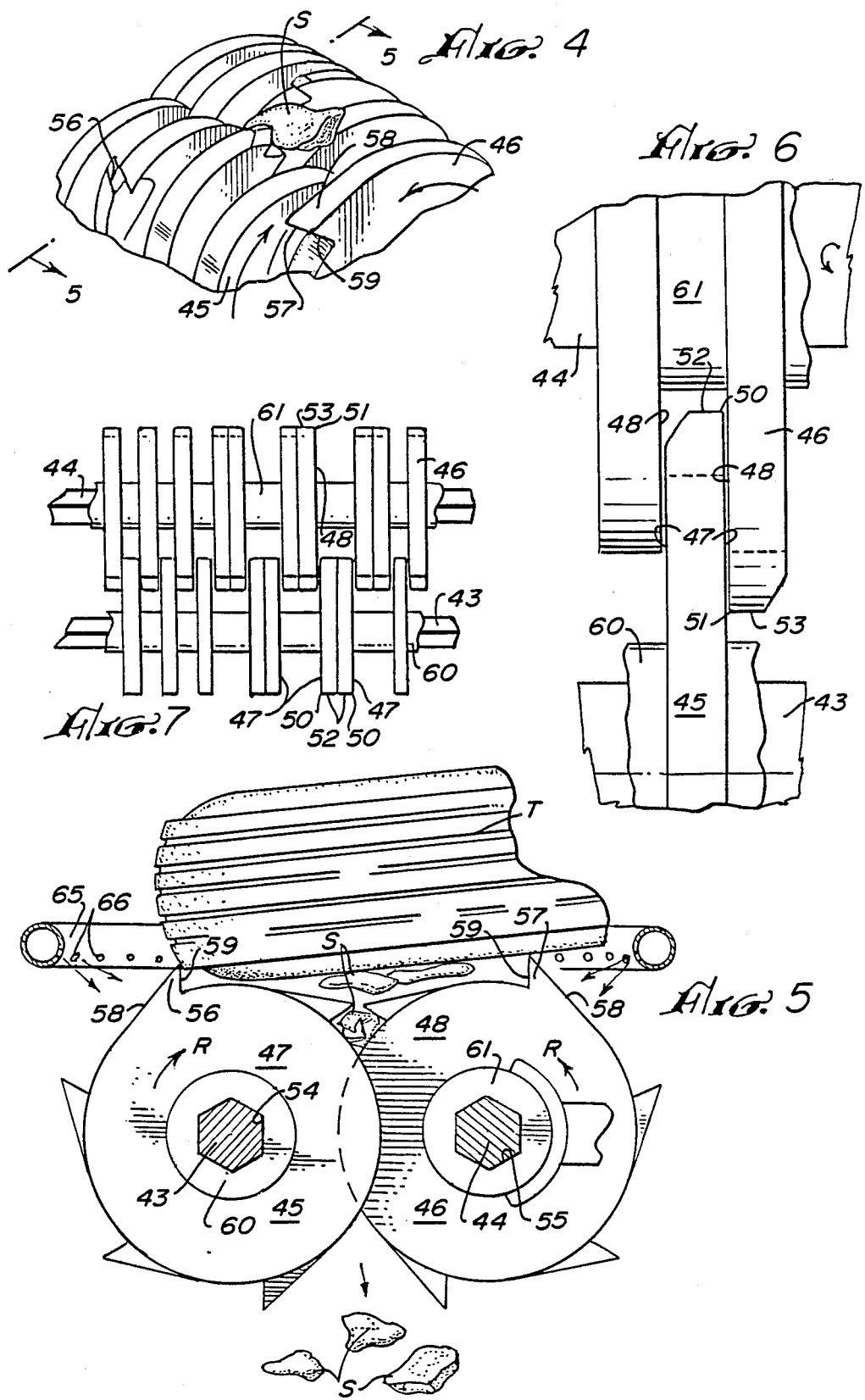

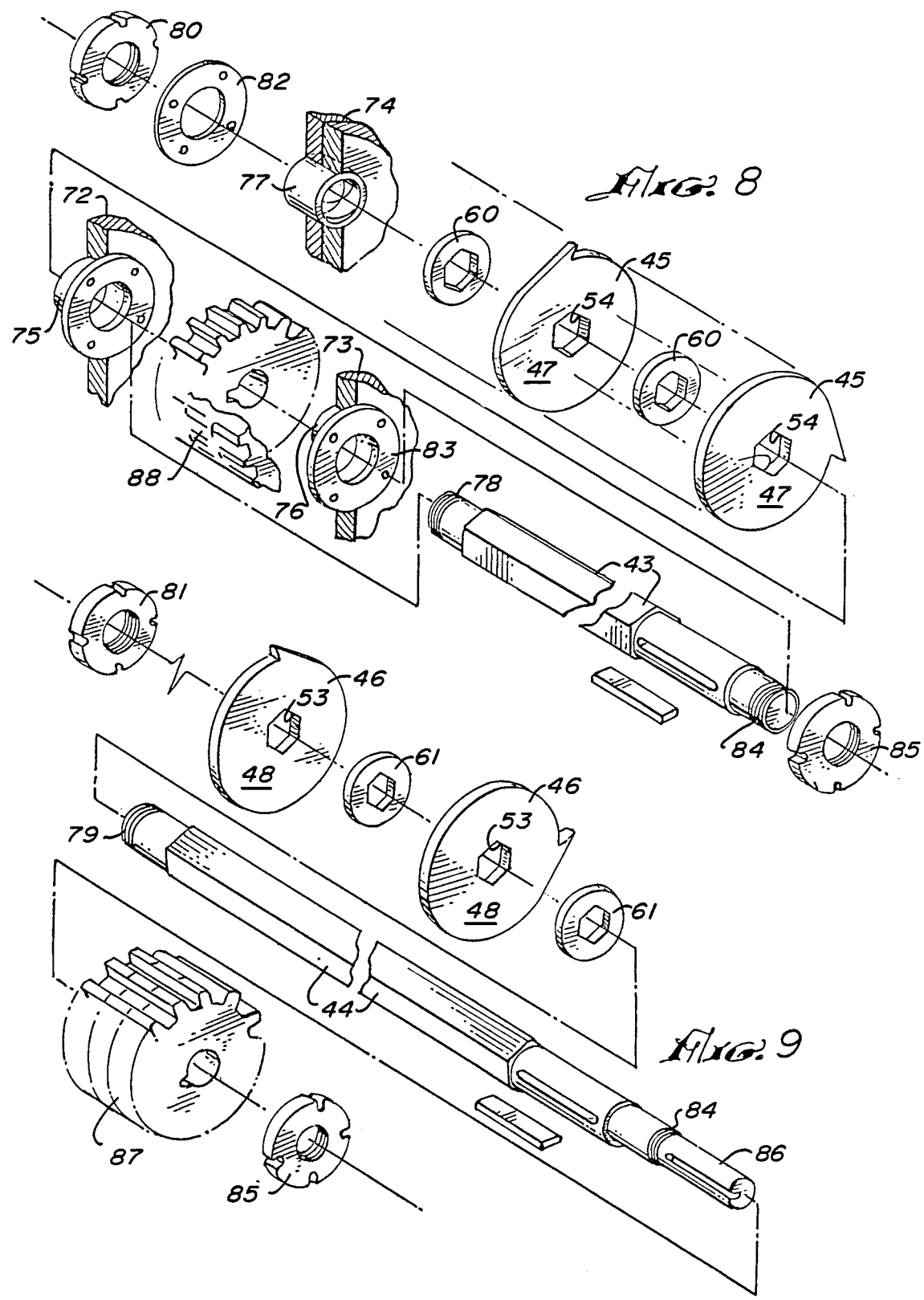

APPARATUS FOR SHREDDING RUBBER TIRES

REFERENCE TO RELATED APPLICATION

This application is a continuation-in-part of application Ser. No. 520,467, filed Aug. 4, 1983 now abandoned.

BACKGROUND OF THE INVENTION

This invention relates to the shredding of discarded rubber tires, especially vehicle tires.

FIELD OF THE INVENTION

It has been estimated that there are 230 million discarded pneumatic vehicle tires carcasses piling up daily in the United States alone. Both governmental and private agencies operating disposal facilities and land-fill facilities have found that pneumatic tire carcasses are among the most difficult objects to get rid of. They cannot, for example, simply be thrown in a pile and covered over with dirt because, being hollow, they tend to work their way towards the surface and result in a very unstable fill. Several operating agencies have tried burning whole tires, but anyone who has ever been around burning rubber, is immediately aware that incineration of whole tires is an unsatisfactory approach and, indeed, is ecologically unsound. However, controlled burning can be useful if the tires are first shredded.

Considering the importance of environmental concerns and ecological considerations, simply discarding a used tire is grossly wasteful of available energy and of other resources. An average automobile tire, for example, weighing a little more than 20 pounds, may comprise ten pounds of rubber polymer, more than six pounds of carbon black, approximately four pounds of oil and another pound or so of valuable chemicals. If a tire is cut up into small enough pieces, it is possible to recover many of these valuable materials from the tire carcass. Even if no such recovery is attempted, tires, once cut up, can be used in land fills or as fuel.

The problem, however, of cutting up a rubber tire carcass has eluded science and industry alike, although several efforts have been made.

BRIEF ANALYSIS OF THE PRIOR ART

The rubbery elastic deformability of a tire carcass, even one fortified with belts of steel, makes it exceedingly difficult to chop up or masticate the carcass by any one of several conventional means. Large anvil and chisel types of cutting machines have been devised, but have been found unsatisfactory, partly because of the large amount of energy required to operate such machines. Attempts to grind up tires have encountered several similar problems. Standing as mute evidence of the failure of previous efforts are veritable mountains of discarded tire carcasses which may be seen at any dump site or land-fill facility.

The present invention provides, for the first time, an apparatus for shredding or reducing rubber tire carcasses to small pieces, typically one or two inches in diameter. These pieces are capable of being further reduced to retrieve valuable by-products such as carbon black, oil and combustible gas. Alternatively, the pieces can be used as fuel themselves, and are being used in the lumber industry at this time as fuel. They are also capable of being disposed of, without any of the problems that a tire carcass creates, by being discarded in a dump or land fill facility.

The following description of a preferred embodiment of the present invention will make clear to the reader how this salutary result is achieved.

BRIEF DESCRIPTION OF THE DRAWINGS

FIG. 4 is a partial view in perspective, of a portion of the cutter teeth or chisels acting on a piece of rubber tire.

FIG. 5 is a partial sectional view taken along line 5—5 in FIG. 4 and enlarged, also showing the lubricating spray.

FIG. 6 is a further enlarged fragmentary view of three adjacent cutter wheels.

FIG. 7 is a top plan view of an alternative arrangement of cutter wheels, in which some of the cutter wheels are clustered together.

FIGS. 8 and 9 are exploded views of the shaft, transmission, and bearing arrangement of the shredder.

DESCRIPTION OF SOME PREFERRED EMBODIMENTS OF THE INVENTION

Figure 1:
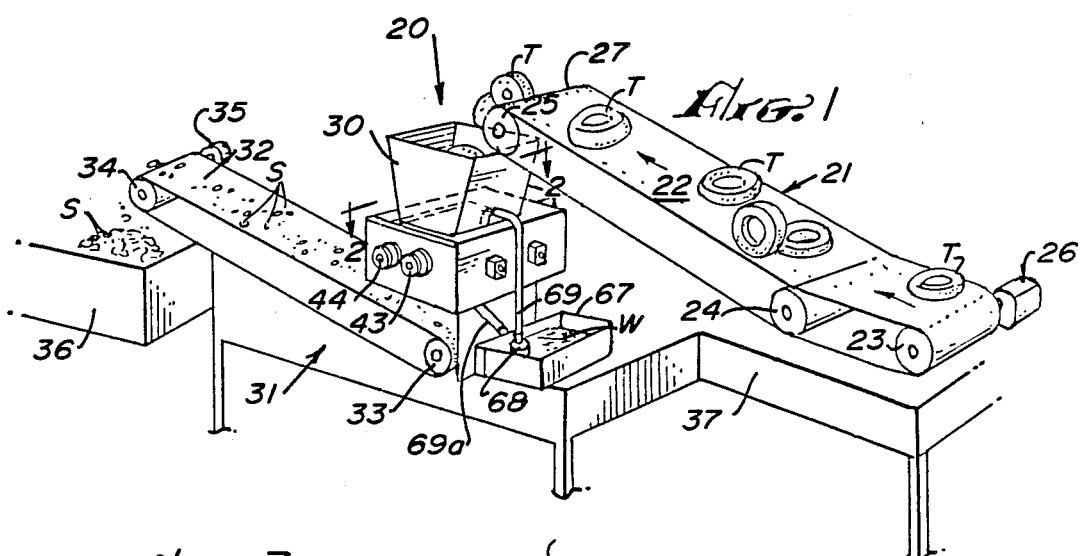
FIG. 1 is a pictorial view of a tire shredding apparatus constructed in accordance with the principles of the present invention.

FIG. 1 somewhat schematically shows an apparatus 20 for shredding rubber tires according to the principles of this invention. Tire carcasses T may be fed into the apparatus 20 by a conveyor 21 having a belt 22 disposed over rollers 23, 24 and 25, at least one of which is driven by a power source such as a motor 26. A portion of the conveyor 21 is capable of being elevated to position a discharge end 27 above and in alignment with a hopper 30 of the shredder 20, which is explained in detail below.

Upon completion of the shredding process, the tire carcasses T are reduced to small shreds S. The shreds S typically have a major dimension of one to two inches in their most convenient form, though their size may be varied, depending upon the end use to which they are to be put.

The shreds S may be deposited upon a discharge conveyor 31 having a belt 32 disposed about rollers 33 and 34, one of which is driven by a power source, such as a motor 35. The discharge conveyor 31 may deliver the shreds S to a storage bin 36 or to the back of a truck or any other convenient container.

While the apparatus 20 is here shown on a platform 37, the size of the apparatus 20 is such that it may be mounted on the back of a truck or other vehicle in order to render the apparatus mobile. In this manner, it may be taken to a dump site or land fill facility where large amounts of tire carcasses have been accumulated. It may also be taken to a source of discarded tire carcasses, e.g., a local retail tire outlet which takes such carcasses in trade on the sale of new or recapped tires.

The heart of the invention, of course, rests in the shredder apparatus 20 itself. One of the most vexing problems addressed by the present invention is the relative lack of resistance to deformation offered by the natural or synthetic rubber material introduced into the shredder 20. This problem continues even though steel belting is now common in many tires. The tires tend to bounce up and down on top of the cutting or shredding apparatus, and this problem is not solved by merely increasing (or decreasing) the power employed to drive the cutting machinery. The present invention, through the use of novel techniques, accomplishes the desired result.

Figure 11:
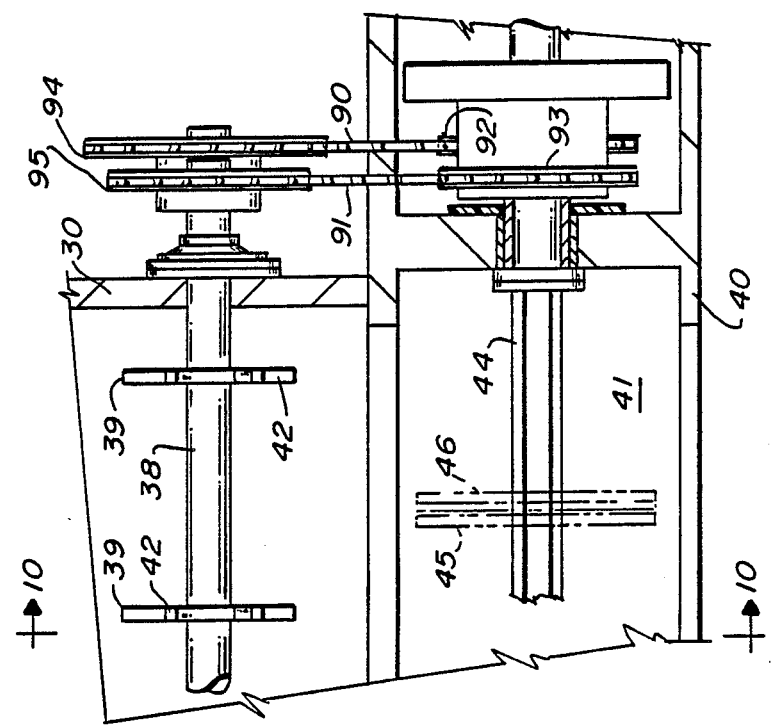
FIG. 11 is a fragmentary view of a portion of the hopper and shredder, taken along the line 11—11 in FIG. 10.
Figure 10:
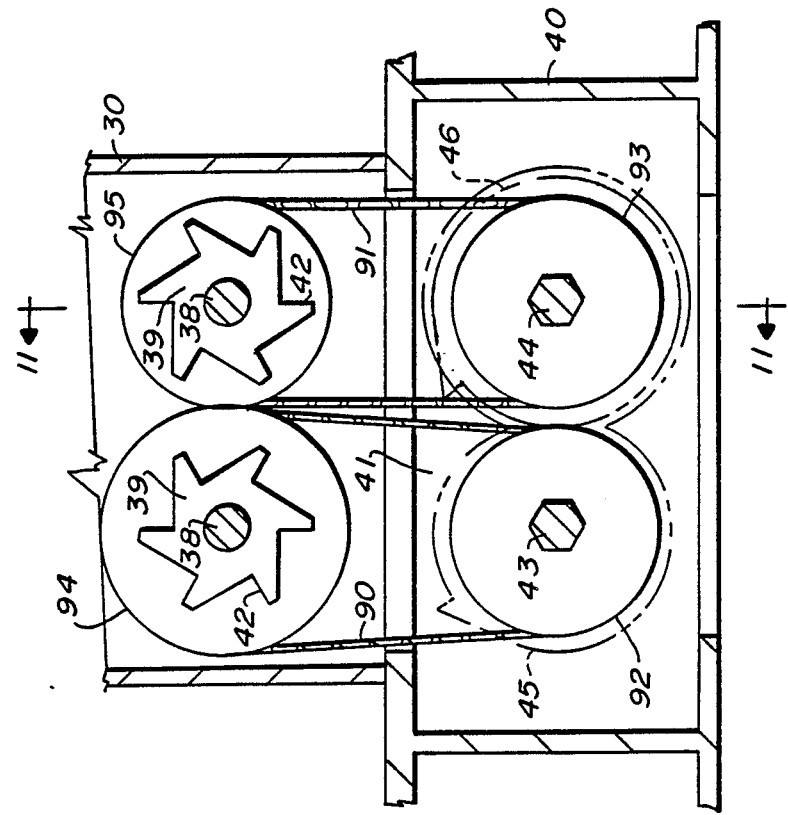
FIG. 10 is a view in elevation and in section of the input hopper and the shredder together, disposed as in FIG. 3.

At the very beginning, the hopper 30 is not merely an open bin. As shown in FIGS. 10 and 11, it preferably includes one or more pairs of driven feed rolls 38 with sets of toothed wheels 39 mounted there along and fixed thereto and acting to engage, force down, and hold down the carcasses T, guiding and feeding them positively to a main housing 40.

Figure 2:
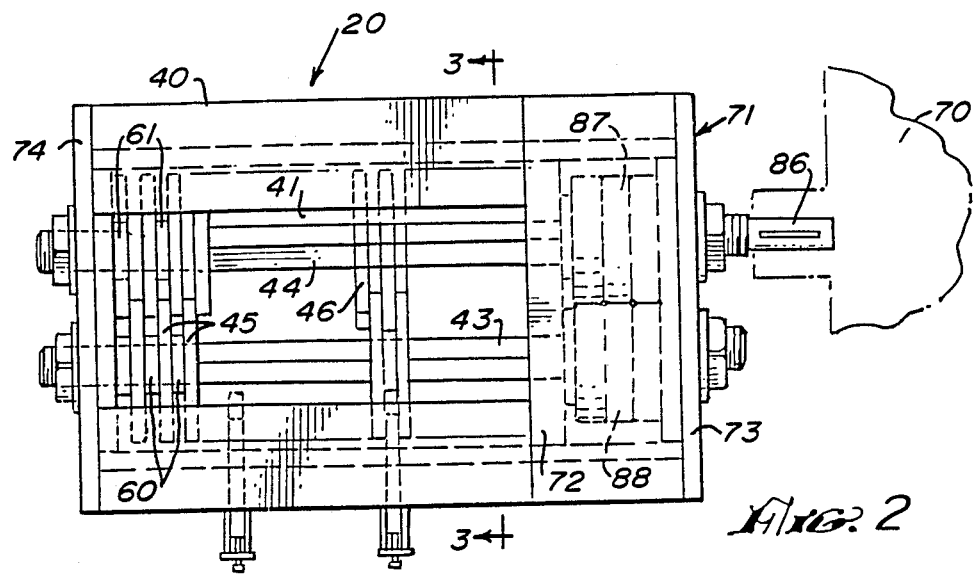
FIG. 2 is an enlarged top plan view of the shredder, taken along lines 2—2 in FIG. 1, with the hopper removed.
Figure 3:
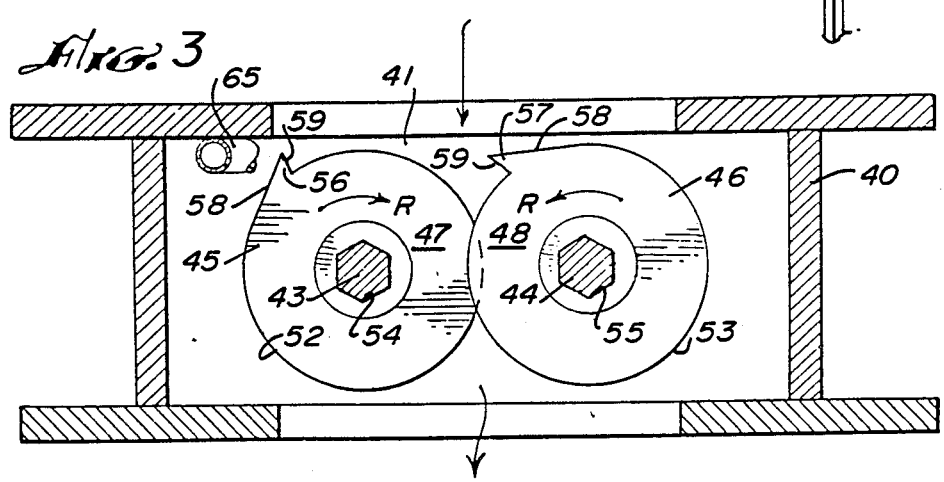
FIG. 3 is a view in section taken along the line 3—3 in FIG. 2.

FIGS. 2 and 3 show that the main housing 40 defines a vertically disposed passage 41 in which the tire carcasses T are shredded. The hopper 30 is disposed directly above the vertical passage 41 and immediately below the terminus of the feed conveyor 21. The hopper 41 may be supported directly by the housing 40. The toothed feed wheels 39 may have teeth 42 that are rotated in such a manner that the carcasses T are engaged and forced down and are held down over a pair of horizontal shredder shafts 43 and 44.

As best seen in FIG. 2, the horizontal shafts 43 and 44 lie within the passage 41 and span the housing 40 from end to end. The shafts 43 and 44 are preferably polygonal, e.g., hexagonal.

The present invention shreds the elastic carcasses T by shearing them, cutting them in a way like the cuts made by scissors. This shearing action is achieved by a series of rotating cutter wheels 45 and 46 mounted on the shafts 43 and 44 respectively, so that their side faces 47 and 48 lie close together and act like scissor blades. Edges 50 and 51 are made by intersection of the faces 47 and 48 with the generally circular peripheries 52 and 53 of the wheel. These faces 50 and 51 act like continuously rotating scissor blades.

Each cutter wheel 45 or 46 has an hexagonal opening 54 or 55 by which it is rigidly and snugly secured on its hexagonal shaft 43 or 44, and it is driven thereby. The driving force between each hexagonal shaft 43 or 44 and the wheel 45 or 46 is thus transmitted by the hexagonal juncture as illustrated in FIGS. 3 and 5. Because of the quantum of power to be transmitted through the shafts 43 and 44 to the cutter wheels 45 and 46, it has been found desirable that a maximum amount of surface contact area between each shaft and its wheels be provided to effect the power transmission.

The rotating cutter wheels 45 and 46 form imaginary cylinders of rotation having the axes of the shafts 43 and 44 as the axes of the cylinders. In order to achieve a combined shearing and slicing action, which is necessary to overcome the lack of rigid resistance offered by a tire carcass, the shafts 43 and 44 are counterrotated at different speeds. Preferably one shaft is rotated at 28 r.p.m. and the other is rotated at 34 r.p.m., each in its own direction R, as illustrated. It is important that the speeds be kept near these important speeds, to insure that the teeth 50 grab the tire T and push it down in between the side faces of the wheels 45, 46. A system using speeds as slow as 20 r.p.m. for one shaft and 26 r.p.m. for the other shaft is usable, but it is slow and therefore not as productive as the 28 to 34 r.p.m. speeds. Speeds as fast as 34 r.p.m. for one shaft and 40 r.p.m. for the other can be used, but tend to result in premature wear.

As illustrated in several figures of the drawings, but perhaps best seen in FIGS. 3 and 5, each of the cutter wheels 45 and 46 is provided with at least one tooth 56 or 57. Each tooth 56 or 57 is preferably formed by a surface 58 providing a line tangential to the periphery of the wheel 45 or 46 meeting an undercut, approximately radial surface 59 which is inclined inwardly as illustrated. The teeth 56,57 may do some cutting or tearing of the carcass T, but their main purpose is to snag the carcasses T and force them down in between the shearing faces 47 and 48. The teeth 56 and 57 are projected forward in the direction of rotation of the shaft 43 or 44 to which its wheel 45 or 46 is mounted. Each tooth 56, 57 is preferably formed integrally with the cutting wheel 45 or 46, but it may be separately mounted without departure from the invention. If desired, there may be more than one tooth on each wheel, but one is sufficient and is generally preferred.

Preferably, the teeth 56, 57 are aligned circumferentially on the shafts 43, 44, so as to space each tooth 56 or 57 apart by 60° of rotation from each adjacent tooth 56 or 57 along the same shafts 43 or 44.

Each shaft 43 is disposed with respect to its adjacent shaft 44 at a distance such that their respective cylinders of rotation of their wheels 45 and 46 intersect by a predetermined amount and in a plane equidistant between the adjacent shafts, as may be best seen in FIG. 5. Each shaft 43, 44 carries several cutter wheels 45, 46, either mounted singly or clustered, as in various configurations like those illustrated in FIGS. 4 and 7.

In order to accomplish the proper placement of the cutter wheels 45 and 46 on an individual shaft 43 or 44, spacers 60 and 61, as best seen in FIGS. 8 and 9 are employed. These spacers 60 and 61 have hexagonal openings configured to slip snugly onto the shafts 43, 44 between adjacent cutting wheels 45, 46 (or clusters thereof) to form the arrays illustrated in FIGS. 4 and 7. See also FIGS. 8 and 9. By use of the spacers 60 and 61, the cutter wheels 45 on one shaft 43 have parallel, but noncoincident planes of rotation with the cutter wheels 46 on the adjacent shaft 44. Proper spacing results in the faces 47 and 48 being about 0.004" inch apart, or at least within the range of 0.002" and 0.010" apart for best scissors-type action. With proper spacing, the wheels 45 and 46 are self sharpening, and very little heat is generated in operation.

Tire carcasses T pass into the housing 40 partly by gravitational pull but largely by being caught by the teeth 42 and by the teeth 56 and 57 and pulled down, so that they pass from the hopper 30 and down through the housing 40. There, they are engaged by the counterrotating cutter wheels 45, 46, and the teeth 56 and 57 literally bite into each carcass T and urge the bitten portion of the carcass T towards an adjacent counterrotating cutter wheel. Since each cutter wheel 45 or 46 (or each cluster) on a particular shaft 43 or 44 is so aligned as to intermesh with the counterrotating cutter wheels on an adjacent shaft in a manner as illustrated in FIGS. 6 and 7, there is, at all times, a pair of counterrotating cutter wheels 45 and 46 immediately adjacent one another. As a consequence of the spacing and the directions of rotation, shearing action is developed between the side faces 47 and 48. This action results in a relatively even tearing apart of the carcass T so that the carcass T is ripped into shreds S of approximately the same size. These shreds S are discharged beneath the rotating shafts 43 and 44 and out from the passage 41 onto the conveyor belt 32 of the discharge conveyor 31.

Because of the different speeds of shaft rotation of the two shafts 43 and 44, (28 r.p.m. and 34 r.p.m.) the tooth 56 on one wheel 45 infrequently passes the tooth 57 on an adjacent cutter wheel 46 at the uppermost phase of their movement adjacent the hopper 30. Usually the teeth 56 and 57 are out of phase with each other.

The forces acting on the shafts 43 and 44 are large and tend to cause them to flex during operation. It is important that they be made from an alloy that can flex and spring back without damage. A 4340 spring steel alloy will do this. Other alloys tend to lead to breakage. Also, it is important that the shafts 43 and 44 be supported by bronze bushings that are tight on the shaft, for ball bearing and roller bearing supports soon wear out. The bronze preferably is porous and contains lubricant. The teeth 56 and 57 are also subject to large forces, and a 4140 alloy of 200 Rockwell hardness is recommended.

During operation some heat may be generated. More important, lubricant is needed. This is accomplished by a spray of fluid onto the cutter wheels 45, 46. Water is a very effective lubricating and heat dissipating medium. Therefore, a spray pipe 65 is preferably disposed in the housing 40, preferably generally circular. Perforations 66 are so disposed as to direct a spray of fluid, such as water, onto the cutting wheels 45 and 46, as illustrated best in FIG. 5. As shown in FIG. 1, a sump 67 having lubricating fluid W contained therein is disposed at some convenient point in proximity to the housing 40. A pump 68 urges fluid through a line 69 and through the tube 65 where it is dispersed within the passageway 41. A return line 69a collects accumulated lubricant W and returns it to the sump 67.

While, as has been previously stated, the elastic deformability of tire carcasses is a major factor in the degree of difficulty of the task to which the apparatus of the present invention applies itself, tire carcasses are typically also extremely tough, and are rendered even tougher by virtue of the bias ply construction which may be, in the typical case, steel or polyester. As a consequence, considerable power must be delivered to the shafts 43 and 44, and it must be delivered uniformly and on demand. In order to provide this power, a reciprocating engine or an electric motor or gas engine may be used as a power source 70. The housing 40 is constructed with a transmission casing 71 having bearing walls 72 and 73. One wall 74 of the housing 40, which is remote from the bearing wall 72 is, likewise, a bearing plate. Both shafts 43 and 44 project through each of the bearing walls 72, 73, and 74, as seen in FIG. 2. Bronze bushings 75 and 76 are disposed in the bearing walls 72 and 73, respectively, to support the shafts 43 and 44 rotatably, and a similar bronze bushing 77 supports the remote end of each shaft 43 and 44 in the wall 74. The bronze bushings 75, 76, and 77 preferably are porous and contain lubricant; they may be combined with thrust bearings well known in the art and are snug on the shafts 43 and 44. The remote ends of each shaft are threaded as at 78 and 79, and nuts 80 and 81 secure the ends against bushing plates 82 and 83. In a like manner, the drive end of each shaft is also threaded, as at 84 and secured by nut 85. The drive end of the shaft 44, however, as may be best seen in FIG. 9, includes a protruding jack shaft 86 which engages the power source 70 in order to provide power input to the shredder.

Within the transmission case 71, a series of drive gears 87 are arrayed in parallel and are keyed to the shaft 43 in a well known manner. They are positioned to directly engage a compatible set of driven gears 88 keyed to the shaft 44 so as to provide a direct drive counterrotating action.

As shown in FIGS. 10 and 11, the shafts 38 and 39, respectively, are driven by the shafts 43 and 44, through respective chains 90 and 91 which engage either sprocket wheels or gears 92 and 93 on the shafts 43 and 44 and 94 and 95 on the shafts 38 and 39. In order that the shafts 38 and 39 may rotate at the same speed, the sprocket wheels or gear 94 is larger in diameter than the sprocket wheel or gear 95.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A tire shredder, including in combination
   a housing having a vertical passage therethrough,
   a pair of horizontally mounted parallel drive shafts supported rotatably in said housing in said passage with a defined spacing between the shafts,
   a series of disk-shaped cutting wheels on each said shaft, each said wheel having a generally round periphery and flat side faces meeting the periphery at a sharp edge, said periphery having at least one tire-seizing tooth thereon,
   a series of disk-shaped spacers keyed to each said shaft between some of its said cutting wheels, each approximately the same width as a said cutting wheel but of a significantly smaller radius, said spacers being so disposed that the cutting wheels on one shaft are not opposite those on the other said shaft but are opposite and apart from the spacers of the other said shaft, said shafts being so spaced apart that the circles of revolution of the cutting wheels on one shaft overlap the circles of revolution of the cutting wheels on the other shaft to provide a scissors-like cutting relationship with adjacent side faces about 0.002" to 0.010" apart, and
   driving means for said shafts driving them for counterrotation relative to each other at speeds of about 20 to 34 r.p.m. for one shaft and about 26 to 42 r.p.m. for the other shaft, the speed of the other shaft being about 6 r.p.m. faster than the speed of the one shaft.

2. The tire shredder of claim 1 wherein said speeds are 28 r.p.m. for one shaft and 34 r.p.m. for the other shaft.

3. The tire shredder of claim 1 wherein said shafts are of spring steel.

4. The tire shredder of claim 3 wherein the spring steel is 4340 alloy.

5. The tire shredder of claim 1 wherein said shafts are supported in said housing by lubricated bronze bushings.

6. The tire shredder of claim 1 wherein said wheel teeth are each defined by a filled portion having an outer surface tangent to said wheel meeting an undercut, approximately radial surface portion.

7. The tire shredder of claim 1 having a feed hopper above said housing having parallel counter-rotating feed shafts therein parallel to, vertically aligned with, the same distance apart as, and generally synchronized with said drive shafts, said feed shafts having thereon wheels with large teeth, in the order of one-third their outer radius, rotated by said feed shafts to direct and force unshredded tires down toward said drive shafts and prevent their returning up.

8. The tire shredder of claim 1 having some of said cutting wheels clustered along their shafts opposite similarly clustered spacers.

9. The tire shredder of claim 1 wherein said drive shafts are hexagonal and said cutting wheels and said spacers have central hexagonal openings for keying them to their respective shafts.

10. The tire shredder of claim 1 wherein the teeth, at least, of said cutting wheels are made from 4140 steel alloy of 200 Rockwell hardness.

11. The tire shredder of claim 1 wherein the spacing between adjacent cutting wheel side faces is about 0.004".

12. The tire shredder of claim 1 having lubricant-spray means for spraying lubricant upon the drive shafts, cutting wheels, and the tire carcasses and portions passing through said passage.

13. The tire shredder of claim 12 wherein said lubricant spray means is a horizontal perforated tube just above said drive shafts.

14. The tire shredder of claim 12 having recirculation means for collecting the sprayed lubricant and using it again through the lubricant spray means.

15. A tire shredder, including in combination
 a housing having a vertical passage therethrough, through which tires being shredded pass,
 a pair of horizontally mounted, parallel, hexagonal drive shafts of 4340 spring steel alloy, supported rotatably in said housing in said passage by bronze bushings, with a defined spacing between the shafts,
 a series of disk-shaped cutting wheels with hexagonal openings fitting snugly on each said shaft, each said wheel having flat side faces meeting a periphery at a sharp edge, each said periphery being generally round and having at least one tooth thereon defined by a filled tangent portion meeting an undercut, approximately radial, surface portion,
 a series of round spacers with flat side walls and hexagonal openings fitting snugly on each said shaft between some of its said cutting wheels, each approximately the same width as a said cutting wheel but of a significantly smaller radius, so disposed that the cutting wheels on one shaft are not opposite those on the other said shaft but are opposite but transversely spaced apart from the spacers on the other said shaft, said shafts being so spaced apart so that the peripheries of the cutting wheels on one shaft overlap the peripheries of those on the other shaft, to provide a scissors-like cutting relationship between adjacent side faces, which are kept about 0.002" to 0.010" apart,
 a hopper above said housing with a passage therethrough aligned with the passage through said housing, having an open end for the introduction of tires to be shredded,
 a pair of parallel counter-rotating feed shafts in said hopper, each parallel to one said drive shaft and lying in the same vertical plane therewith and having toothed feed wheels thereon for forcing whole tires down to said housing,
 driving means for said drive shafts driving them for counterrotation relative to each other at speeds of about 28 r.p.m. for one shaft and about 34 r.p.m. for the other shaft, and
 lubricant means located just above said drive shafts for spraying liquid on the cutting wheels and the tires being shredded.

16. The tire shredder of claim 15 wherein said shafts are supported in said housing by lubricated bronze bushings.

17. The tire shredder of claim 15 having some of said cutting wheels clustered along their shafts opposite similarly clustered spacers.

18. The tire shredder of claim 15 wherein the teeth, at least, of said cutting wheels are made from 4140 steel alloy of 200 Rockwell hardness.

19. The tire shredder of claim 15 wherein the spacing between adjacent cutting wheel side faces is about 0.004".

* * * * *